United States Patent [19]

Tagawa

[11] Patent Number: 5,080,440
[45] Date of Patent: Jan. 14, 1992

[54] VEHICLE SEAT BELT WINDING SYSTEM HAVING ANGLED GUIDE WIRE

[75] Inventor: Yuji Tagawa, Ayase, Japan

[73] Assignee: Ikeda Bussan Company Ltd., Japan

[21] Appl. No.: 495,264

[22] Filed: Mar. 16, 1990

[30] Foreign Application Priority Data

Mar. 16, 1989 [JP] Japan .................. 1-30127[U]

[51] Int. Cl.⁵ .................. A62B 35/00; B60R 22/00
[52] U.S. Cl. .................. 297/474; 280/807
[58] Field of Search .............. 297/474, 468, 473, 483, 297/475, 476; 280/807, 801

[56] References Cited

U.S. PATENT DOCUMENTS

| 3,606,456 | 9/1971 | Cazabon | 297/474 |
| 4,373,749 | 2/1983 | Miki et al. | 280/807 |
| 4,582,274 | 4/1986 | Schlotterbeck et al. | 280/807 |

FOREIGN PATENT DOCUMENTS

| 2164544 | 6/1973 | Fed. Rep. of Germany | 297/468 |
| 2449105 | 4/1975 | Fed. Rep. of Germany | 297/468 |
| 101856 | 6/1983 | Japan. | |
| 1247672 | 9/1971 | United Kingdom | 280/807 |

Primary Examiner—Kenneth J. Dorner
Assistant Examiner—James M. Gardner
Attorney, Agent, or Firm—Gifford, Groh, Sprinkle, Patmore and Anderson

[57] ABSTRACT

A vehicle seat is provided with a seat belt winding retractor, in which the seat belt retractor is secured through a fixed bracket to the side section rear end side of a seat cushion. A wire guide is attached to the fixed bracket to guide a seat belt in a flattened state to the entrance of the seat belt winding retractor. The guide allows for the winding and unwinding of the belt by preventing bending and twisting of the seat belt, especially when a front seat back is folded forward to allow entry to the rear seat.

1 Claim, 1 Drawing Sheet

VEHICLE SEAT BELT WINDING SYSTEM HAVING ANGLED GUIDE WIRE

FIELD OF THE INVENTION

The present invention relates to seat belts and more particularly to guide means for the retractor for such seat belts.

DESCRIPTION OF THE PRIOR ART
BACKGROUND OF THE INVENTION

In recent years the need to make seat belts closely fit the front seat occupants of a vehicle has become more important because of the increased emphasis on safety. Seat belts have also become standard equipment for rear seat passengers. Front seat belt arrangements of the following type are known: A seat belt is held in a holding condition for a vehicle passenger and in a releasing condition to permit a passenger to enter and exit the vehicle in timed relation to the opening and closing of the door. In a vehicle seat provided with such a seat belt arrangement, it is a conventional to provide an emergency lock type retractor for winding and unwinding the seat belt which is installed through a fixed bracket mounted near the rear side of the seat cushion.

SUMMARY OF THE INVENTION

The present invention relates to improvements in a seat assembly with a seat belt winding retractor, suitable for application, for example, in a front seat of an automotive vehicle.

In a vehicle seat assembly equipped with the above-mentioned conventional seat belt structure, if the seat belt winding action is incomplete, the result is looseness of the seat belt. As a result, when a passenger opens and then closes a door to exit the vehicle, a part of a seat belt is held by the door, and it is unavoidable that problems such as folding and twisting of the seat belt occur. Such problems occur fairly often, especially during an entry to the back seat in which a seat back is pushed forward and bent downwardly thus forming an acute angle with the seat cushion. When these instances occur, the winding action of the twisted belt interferes with retraction, thereby resulting in the belt not tightly fitting the occupant. Therefore it is desired that some method be developed to ensure the winding action of a seat belt into the retractor in spite of bending, twisting and the like of the seat belt.

In order to meet such a requirement, according to the present invention, a vehicle seat with the seat belt winding retractor is provided with a seat belt guide of wire. The wire seat belt guide directs the seat belt in a flattened state to the winding entrance of the seat belt retractor even when the belt is in a condition of being bent and/or twisted. The seat belt winding retractor is secured to the fixed bracket normally provided as a part of the seat assembly to the side section towards the rear end of the seat cushion. According to the present invention, the seat belt guide of wire has a seat belt guide section which is generally V-shaped in form and which includes a horizontal part and an inclined part rising obliquely upward.

According to the present invention, the seat belt guide formed of wire flattens and guides a seat belt smoothly and securely to the retractor winding entrance even if the seat belt is in a condition of being bent and twisted, thereby adequately accomplishing the winding operation. The horizontal and inclined portions of the guide section also tend to keep the belt from becoming twisted as it is being moved out of the retractor.

DETAILED DESCRIPTION OF THE PREFERRED EMBODIMENT

Figure 1:
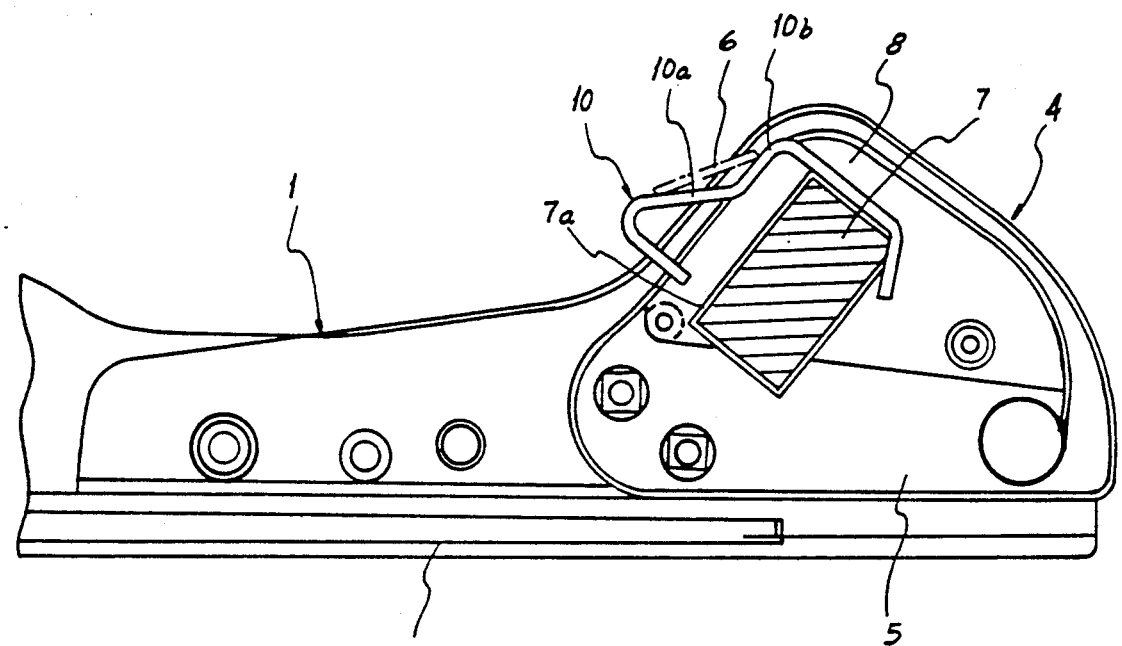
FIG. 1 is an enlarged side view of an essential part of an embodiment of a vehicle seat with a retractor for winding a seat belt.

The present invention will be explained in detail hereinafter with reference to an embodiment shown in the drawing.

Figure 2:
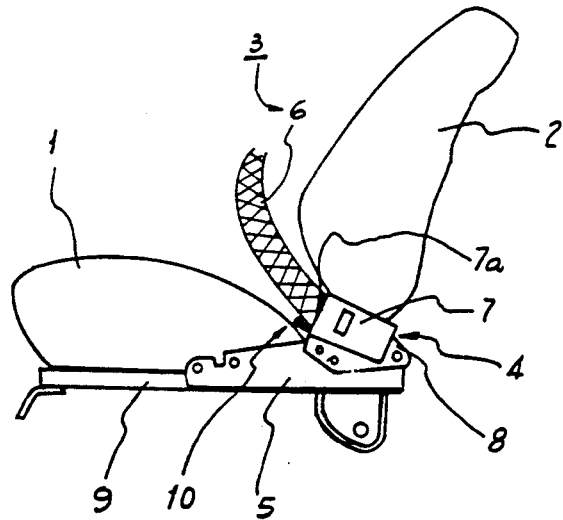
FIG. 2 is a schematic side view of the vehicle seat to which the present invention is applied.

FIG. 1 and FIG. 2 show an embodiment of a vehicle seat with a retractor for winding a seat belt. As can best be seen in FIG. 2, a vehicle seat 3 including a seat cushion 1 and a seat back 2 is equipped with a reclining mechanism 4 which inclinably supports the seat cushion 1. A part of the reclining mechanism 4 includes a fixed bracket 8 upon which is mounted an emergency lock type retractor 7 which winds and unwinds the seat belt 6. Another end of the seat belt 6 is connected as is conventional to an installed part of a door side (not shown). Reference numeral 9 in FIG. 2 indicates a slide mechanism for supporting the seat cushion 1. Additionally, the seat 3 is suitably provided with conventional necessary mechanical parts and the like.

According to the present invention, and as can best be seen in FIG. 1, the vehicle seat 3 with the retractor 7 for winding the seat belt 6 is characterized by having a seat belt guide 10 as a part of the fixed bracket 8. The seat belt guide 10 is formed of wire and is arranged to flatten and guide the seat belt 6 to and from a winding entrance 7a of the retractor 7. The retractor 7 is installed through the fixed bracket 8 to the section of the reclining mechanism 4 of the side section rear end towards the seat cushion 1. Even in a condition of the seat belt being bent and twisted the guide 10 will strengthen the seat belt before it reaches the retractor 7 to allow for proper winding and unwinding of the seat belt.

In the present embodiment, as shown in FIG. 1, the belt guide 10 is formed generally in a V-shape having a horizontal part 10a and a second part which depends obliquely downwardly from one end of the horizontal part 10a the guide 10 further includes an inclined part 10b rising obliquely upwardly from the other end of the horizontal part 10a.

According to this simple and inexpensive arrangement, the seat belt 6 can be wound into and out of the retractor 7 smoothly and adequately despite being twisted so that the belt can function properly as a seat belt 6. According to the present invention, the above-mentioned seat belt guide 10 of wire is installed integrally with the fixed bracket 8 to which the retractor 7 is secured. As a result of this arrangement it is not affected by shifting of the position of the seat or in assembly parts of the seat, thereby facilitating assembly and use of the seat arrangement.

Additionally, according to the present invention, the seat belt guide 10 is made of wire, and is formed generally in a V-shape and includes the horizontal part 10a and the inclined part 10b which rises obliquely upward. This solves the problems in which, for example, a smooth winding action is prevented when the seat belt 6 moves away from the guide 10 and then becomes twisted causing the belt to become jammed upon retraction. When entry to the back seat is attempted, the belt 6 tends to move forward; however in this case, with the existence of the inclined part 10b, the belt can be guided in a sliding manner while being supported by the horizontal part 10a. This feature serves to prevent folding, twisting and the like of the belt. Even if the seat back 2 is moved into a bent down position the horizontal part 10a of the device supports the seat belt, which can now be held without folding and twisting, as the seat belt and the holder are in a generally parallel condition.

As explained above, according to the present invention, the vehicle seat with the retractor for winding up the seat belt is provided at the fixed bracket with the seat belt guide. The seat belt guide is formed of wire and arranged to flatten and guide the seat belt to the winding entrance of the retractor through the fixed bracket to the side section towards the rear end of the seat cushion. Therefore, although it is a simple and inexpensive device, the use of it allows the seat belt to be wound smoothly and adequately in a condition of no folding and twisting of the seat belt. This provides excellent practical benefits as the seat belt can properly function as a seat belt. According to the present invention, the seat belt guide of wire is formed generally V-shaped and includes the horizontal part and the inclined part rising obliquely upward. This V-shape along with the horizontal portion solves the problems in which, for example, smooth winding action is prevented as when the seat belt gets out of the guide.

The present invention is not limited to the structure of the preferred embodiment, and can be suitably adapted and changed as necessary for the shape and structure of respective parts. Additionally, suitable adapted examples will be designed according to the shape and structure of the seat belt 6, the retractor 7, the fixed bracket 8 and the like.

I claim:

1. A seat belt winding system comprising: a seat belt winding retractor, in which said seat belt winding retractor is secured through a fixed bracket to a side section rear end side of a seat cushion; a seat belt; a wire; said wire mounted to said fixed bracket adjacent to the seat belt winding retractor; said wire having a first leg (10a) and a second leg which are joined at one end and form a V-shaped portion, said first leg (10a) extending substantially a horizontal orientation and said second leg extending acutely downwardly from said first leg (10a); said wire further having an inclined portion (10b) rising obliquely upward from a second end of said first leg (10a); wherein said first leg (10a) of said wire and said inclined portion (10b) of said wire are dimensioned so that said first leg (10a) of said wire engages and supports a first side edge of said seat belt (6) while said inclined portion (10b) of said wire engages and supports a second side edge of said seat belt; wherein said seat belt is spaced from the second end of the first leg (10a) at its junction with said inclined portion (10b).

* * * * *